(12) United States Patent
Siewert et al.

(10) Patent No.: US 11,539,093 B2
(45) Date of Patent: Dec. 27, 2022

(54) HOUSING FOR ACCOMODATING A BATTERY PACK AND METHOD FOR PRODUCING SUCH A HOUSING

(71) Applicant: Erwin Quarder Systemtechnik GmbH, Espelkamp (DE)

(72) Inventors: Georg Siewert, Pohlheim (DE); Alexander Heitbrink, Stemwede (DE)

(73) Assignee: Erwin Quarder Systemtechnik GmbH, Espelkamp (DE)

( * ) Notice: Subject to any disclaimer, the term of this patent is extended or adjusted under 35 U.S.C. 154(b) by 123 days.

(21) Appl. No.: 17/004,685

(22) Filed: Aug. 27, 2020

(65) Prior Publication Data
US 2021/0066686 A1 Mar. 4, 2021

(30) Foreign Application Priority Data
Sep. 4, 2019 (DE) .......................... 102019006234.5

(51) Int. Cl.
| | |
|---|---|
| *H01M 50/20* | (2021.01) |
| *H01M 10/613* | (2014.01) |
| *H01M 10/653* | (2014.01) |
| *H01M 10/647* | (2014.01) |
| *H01M 10/656* | (2014.01) |
| *H01M 50/116* | (2021.01) |

(52) U.S. Cl.
CPC ......... *H01M 50/20* (2021.01); *H01M 10/613* (2015.04); *H01M 10/647* (2015.04); *H01M 10/653* (2015.04); *H01M 10/656* (2015.04); *H01M 50/116* (2021.01); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 2012/0121956 A1 | 5/2012 | Park | |
| 2013/0252059 A1* | 9/2013 | Choi | B29D 99/006 156/60 |
| 2016/0093849 A1* | 3/2016 | DeKeuster | H01M 10/0481 429/61 |
| 2018/0013113 A1* | 1/2018 | Wuensche | H01M 10/625 |
| 2018/0375075 A1 | 12/2018 | Yoshimura | |

FOREIGN PATENT DOCUMENTS

| | | |
|---|---|---|
| DE | 102012213308 A1 | 9/2013 |
| EP | 3327817 A1 | 5/2018 |

OTHER PUBLICATIONS

Deutsches Patent-Und Markenamt (German Patent and Trademark Office), Recherchebericht (search in a related application), dated Oct. 31, 2019.

* cited by examiner

*Primary Examiner* — Karie O'Neill Apicella
(74) *Attorney, Agent, or Firm* — Laurence P. Colton; Smith Tempel Blaha LLC

(57) ABSTRACT

A housing for receiving a rechargeable battery pack having a plurality of rechargeable battery cells, in particular prismatic rechargeable battery cells or rechargeable pouch battery cells, having an encircling, preferably injection-molded, housing wall of plastics material which laterally surrounds a receptacle space for the rechargeable battery pack and in which at least one wound package wound from a strand of continuous fibers is integrated as a reinforcement structure, and to a method for producing such a housing.

27 Claims, 9 Drawing Sheets

HOUSING FOR ACCOMODATING A BATTERY PACK AND METHOD FOR PRODUCING SUCH A HOUSING

CROSS REFERENCE TO RELATED APPLICATIONS

This patent application claims the benefit of and priority to German Patent Application No. 10 2019 006 234.5 having a filing date of 4 Sep. 2019.

BACKGROUND OF THE INVENTION

Technical Field

The present invention relates to a housing for receiving a rechargeable battery pack having a plurality of, in particular cuboid, cells, and to a method for producing such a housing. The invention furthermore relates to an assembly of such a housing and a rechargeable battery pack contained therein, as well as to a method for producing such an assembly.

Prior Art

Rechargeable battery packs with a high output, as are used in the automotive or electric vehicle or aviation sector, for example, significantly expand during charging and discharging procedures. This can be traced back to expansion procedures of the individual rechargeable battery cells installed therein, this also being referred to as swelling. This behavior increases as the age of the cells increases. During the swelling high forces act on the wall portions of the respective housing in which such a rechargeable battery pack is typically disposed in order to be protected against external influences. In order to withstand said forces, steel sheets or diecast parts are used in rechargeable battery packs of this type. However, steel or metal, respectively, as a raw material is comparatively expensive and moreover has a comparatively high weight. Furthermore, the required shaping in the context of the production is cost intensive.

BRIEF SUMMARY OF THE INVENTION

Proceeding therefrom it is an object of the present invention to refine a housing and an assembly of the type mentioned at the outset as well as the corresponding methods for producing such housings and assemblies.

This object is achieved by a housing for receiving a rechargeable battery pack having a plurality of rechargeable battery cells, in particular prismatic rechargeable battery cells or rechargeable pouch battery cells, having an encircling, preferably injection-molded, housing wall of plastics material which laterally surrounds a receptacle space for the rechargeable battery pack and in which (at least) one wound package wound from a strand of continuous fibers is integrated as a reinforcement structure.

This object also is achieved by an assembly of a housing and a rechargeable battery pack contained therein, said rechargeable battery pack having a group of rechargeable battery cells, in particular prismatic rechargeable battery cells or rechargeable pouch battery cells, which are in case adjacent to one another and disposed beside one another in one row.

This object also is achieved by a production method for producing a housing for receiving a rechargeable battery pack having a plurality of rechargeable battery cells, preferably prismatic rechargeable battery cells or rechargeable pouch battery cells, comprising the following measures:
a) winding a wound package from a continuous fiber strand, in particular of aramid and/or carbon and/or glass fibers which are embedded in a matrix of thermosetting or thermoplastic plastics material or polymer material, for producing an encircling housing wall which can laterally surround a receptacle space for a rechargeable battery pack; and
b) producing an encircling housing wall which can laterally surround a rechargeable battery pack by over-molding or insert-molding, in particular on all sides, the wound package with plastics material in an injection-molding device.

This object also is achieved by a production method for producing an assembly of a housing for receiving a rechargeable battery pack having a plurality of preferably prismatic rechargeable battery cells or rechargeable pouch battery cells and a rechargeable battery pack contained therein, having a group of rechargeable battery cells, in particular prismatic rechargeable battery cells or rechargeable pouch battery cells, which are in each case mutually adjacent and disposed beside one another in one row, said method comprising the following measures:
a) winding from a continuous fiber strand, in particular of aramid and/or carbon and/or glass fibers which are embedded in a matrix of thermosetting or thermoplastic plastics material or polymer material, a wound package for producing an encircling housing wall which laterally surrounds a receptacle space for a rechargeable battery pack;
b) producing the encircling housing wall which laterally surrounds the receptacle space for a rechargeable battery pack, by inserting the hollow wound package into an injection-molding device, as well as subsequently over-molding or insert-molding, in particular on all sides, the hollow wound package with plastics material; and
c) incorporating a rechargeable battery pack into the receptacle space, respectively.

Accordingly, a housing for receiving a rechargeable battery pack, preferably for electric vehicles or electric aircraft, is specified according to the invention, said rechargeable battery pack having a plurality of rechargeable battery cells, having an encircling, preferably injection-molded, housing wall of plastics material which laterally surrounds an in particular substantially cuboid receptacle space for the rechargeable battery pack and in which (at least) one wound package wound from a strand of continuous fibers is integrated as a reinforcement structure.

The rechargeable battery cells of the rechargeable battery pack can be inter alia so-called prismatic rechargeable battery cells which have a substantially cuboid shape and which typically have in each case one dimensionally stable, or solid, respectively, metal housing. However, the use of other rechargeable battery cells such as, for instance, rechargeable pouch battery cells, in which a flexible, for instance aluminum-based, foil serves as a housing or as a casing, respectively, is also conceivable.

Accordingly, a housing for large-format rechargeable battery packs, or rechargeable battery packs with a high output, respectively, is specified for the first time according to the invention, in which housing parts for preventing or restricting the swelling of the rechargeable battery pack composed of steel or of other metals can be dispensed with. Rather, the housing, optionally with the exception of the wound package if the latter is not made of plastics material or plastics-material fibers, respectively, can be produced completely from plastics material(s). Corresponding advantages are derived therefrom according to the invention, such as a low weight and cost-effective material costs and processing costs in the context of the production of the housing.

The wound package integrated in the housing wall herein can preferably be a (wound) hollow member which is adapted to the shape of the encircling housing wall and which has individual windings which run in the direction of encirclement in the encircling housing wall.

In so far as the receptacle space is concerned, said receptacle space toward the bottom can be delimited by a base area which serves as a support face for a rechargeable battery pack.

The windings of the wound package in the housing wall herein can preferably run in each case so as to be parallel, or substantially parallel, to said base side.

The base area in turn can run so as to be perpendicular, or substantially perpendicular, to the encircling housing wall.

According to the invention, the wound package, preferably while forming the housing wall, can be over-molded or insert-molded, in particular on all sides, with the plastic material of the housing wall.

The housing can furthermore preferably have a preferably injection-molded base wall which is in particular connected in an integral manner to the encircling housing wall, said base wall preferably also being able to serve as a support face of the housing.

A cooling component for discharging heat from a rechargeable battery pack situated in the receptacle space can be integrated in the housing, preferably in a/the base, or in the base region, respectively, of the housing, coolant being able to be directed through said cooling component.

The coolant component herein can have a main body of plastics material as well as an in particular plate-shaped thermally conducting member which is connected in a liquid-tight manner to said main body and which is of a material of which the thermal conductivity is greater than the thermal conductivity of the plastics material of the main body, in particular of a plastics material of a higher thermal conductivity or of metal, wherein the thermally conducting member for transmitting heat from the thermally conducting member to cooling liquid situated in a cooling liquid chamber of the cooling component possesses an internal side which is adjacent to the cooling liquid chamber, and for transmitting heat from a/the rechargeable battery pack to the thermally conductive member possesses an external side, in particular an external side which points toward the receptacle space for the rechargeable battery pack or is adjacent to the latter.

The above-mentioned optional base face which delimits the receptacle space and which can serve as a support face for a/the rechargeable battery pack herein can be formed by the external side of the in particular plate-shaped thermally conducting member of the cooling component.

Furthermore, one or a plurality of walls of the cooling component, in particular of the main body of the cooling component, can in particular be connected in an integral manner to the encircling housing wall and/or the base wall of the housing.

In so far as the main body of the cooling component is concerned, said main body can have walls that delimit the cooling liquid chamber, of which at least one wall in a connection region is connected in a liquid-tight manner to the thermally conducting member, in particular in such a manner that no cooling liquid can exit the cooling liquid chamber toward the outside through the connection region.

The housing, preferably the cooling component, in particular the main body, can furthermore have an inlet and an outlet by way of which cooling liquid can be supplied to the cooling component, or be discharged from the latter, respectively, wherein the inlet and the outlet are fluidically connected to the cooling liquid chamber.

The main body can preferably be an injection-molded part of in particular fiber-reinforced plastics material, preferably of thermoplastic material.

Said main body can furthermore have a base wall having an in particular upright fully encircling lateral wall which is preferably connected in an integral manner to the base wall and surrounds the cooling liquid chamber toward the outside, the upper side of said lateral wall being connected in a liquid-tight manner to the in particular plate-shaped thermally conducting member such that the internal side of the latter points toward the base wall and the external side of the latter faces the receptacle space for the rechargeable battery pack.

The main body in the space of the main body that is delimited by the lateral wall can have at least one, in particular upright, main body wall which is preferably connected in an integral manner to the base wall and to the lateral wall and which extends between the base wall and the thermally conducting member, the upper side of said main body wall likewise being connected in a liquid-tight manner to the thermally conducting member.

The main body and the thermally conducting member herein can be connected to one another in a liquid-tight manner by way of a form-fitting and/or force-fitting and/or materially integral connection.

In so far as the above-mentioned integration of the cooling component in the housing is concerned, in particular in the base region of the housing, it can be provided that the cooling component sits in a/the housing interior space that is delimited or bordered, respectively, by the housing base wall and the encircling housing wall.

The base wall of the main body herein can be disposed above the base wall of the housing, in particular while bearing on said base wall of the housing, or be disposed on that side of the base wall of the housing that points toward the housing interior, respectively.

The base wall of the main body of the cooling component can preferably be directly adjacent to the base wall of the housing, or bear directly on said base wall of the housing, respectively.

The base wall of the main body can be connected in a form-fitting and/or materially integral and/or force-fitting manner to the base wall of the housing.

In as far as the continuous fiber strand from which the wound package is produced is concerned, said continuous fiber strand can be composed of or comprise aramid and/or carbon and/or glass fibers which are embedded in the matrix of thermosetting or thermoplastic plastics material or polymer material.

In order for such a housing as specified above to be produced, at least the following measures or steps, respectively, are implemented according to the invention:

a) winding a hollow wound package from a continuous fiber strand, in particular of aramid and/or carbon and/or glass fibers which are embedded in a matrix of thermosetting or thermoplastic plastics material or polymer material, for subsequently producing a or the encircling housing wall, respectively, which can laterally surround a/the receptacle space for a rechargeable battery pack;

b) producing an or the encircling housing wall, respectively, which can laterally surround a rechargeable battery pack by over-molding or insert-molding, in particular on all sides, the wound package with plastics material in an injection-molding device.

According to one preferred refinement of this method, the following further measures can be implemented:

a) producing, in particular injection-molding, from an in particular fiber-reinforced plastics material, a main body of a cooling component for discharging heat from a rechargeable battery pack situated in the housing, said main body having walls for forming a cooling liquid chamber as well as at least one connection face for connecting to an in particular plate-shaped thermally conducting member;

b) providing an in-particular plate-shaped thermally conducting member having at least one connection face which is provided for connecting to the connection face of the main body;

c) joining the thermally conducting member and the main body so as to form the cooling component in that the connection faces are connected to one another in a form-fitting and/or force-fitting and/or materially integral manner so as to bear on one another in a liquid-tight manner;

d) producing the encircling housing wall as well as producing an in particular integral connection between the encircling housing wall and the cooling component in an injection-molding device by over-molding or insert-molding the cooling component and the wound package.

A base wall, or the above-mentioned base wall, of the housing can preferably also be injection-molded in the injection-molding device simultaneously with the encircling housing wall, or in the same injection-molding process, respectively.

Furthermore specified according to the invention is an assembly of such an above-defined housing, and a rechargeable battery pack contained therein, specifically in the receptacle space of said housing, said rechargeable battery pack having a group of rechargeable battery cells, in particular prismatic rechargeable battery cells or rechargeable pouch battery cells, which are in each case adjacent to one another and disposed beside one another in one row.

The assembly can preferably comprise at least two separate spacers which are in particular made of plastics material, wherein the first spacer is disposed between a first housing wall portion of the encircling housing wall and a first side of the rechargeable battery pack that is disposed at a first end of the rechargeable battery pack, and the second spacer is disposed between a second housing wall portion, opposite the first housing wall portion, and a second side of the rechargeable battery pack that is disposed on another, second, end of the rechargeable battery pack, opposite the first end.

Each of the spacers can preferably be disposed so as to be pre-tensioned between the housing wall portion assigned thereto and the side of the rechargeable battery pack assigned thereto such that forces acting in the direction of the respective other rechargeable battery pack end by way of each spacer are applied to the respective side of the rechargeable battery pack so as to prevent or reduce any swelling of the rechargeable battery pack.

Each spacer herein can bear directly on the assigned housing wall portion and/or on the assigned side of the rechargeable battery pack.

Each spacer can preferably be adapted to the shape of the assigned housing wall portion and/or the assigned side of the rechargeable battery pack.

In so far as the ends of the rechargeable battery pack that are assigned to the spacers are concerned, said ends can in each case be formed (exclusively) by the first or the last, respectively, rechargeable battery cell in the row of the rechargeable battery cells disposed beside one another.

In order for such an above-specified assembly to be produced, at least the following measures or steps, respectively, are implemented according to the invention:

a) winding from a continuous fiber strand, in particular of aramid and/or carbon and/or glass fibers which are embedded in a matrix of thermosetting or thermoplastic plastics material or polymer material, a hollow wound package as a reinforcement structure for the subsequent production of an encircling housing wall which laterally surrounds a receptacle space for a rechargeable battery pack;

b) producing the encircling housing wall which laterally surrounds the receptacle space for a rechargeable battery pack, while forming the receptacle space, by inserting the hollow wound package into an injection-molding device, as well as subsequently over-molding or insert-molding, in particular on all sides, the hollow wound package with plastics material;

c) incorporating a rechargeable battery pack in to the receptacle space which is laterally enclosed by the housing wall.

According to one preferred refinement of this production method, the rechargeable battery pack, conjointly with two separate spacers, in particular made of plastics material, can be incorporated into the receptacle space such that subsequently the first spacer is disposed between a first housing wall portion of the housing wall and a first side of the rechargeable battery pack that is disposed at a first end of the rechargeable battery pack, and the second spacer is disposed between a second housing wall portion of the housing wall opposite the first housing wall portion, and a second side of the rechargeable battery pack that is disposed at another, second, end of the rechargeable battery pack, opposite the first end.

Each of the spacers can be disposed so as to be pre-tensioned between the housing wall portion assigned thereto and the side of the rechargeable battery pack assigned thereto such that forces acting in the direction of the respective other rechargeable battery pack end by way of each spacer are applied to the respective side of the rechargeable battery pack so as to prevent or reduce any swelling of the rechargeable battery pack.

The rechargeable battery pack, conjointly with the two spacers, can be incorporated into the receptacle space, said two spacers so as to be pre-tensioned herein being pushed onto the mentioned sides of the rechargeable battery pack.

BRIEF DESCRIPTION OF THE DRAWINGS

Further features of the present invention are derived from the appended patent claims, from the description of a preferred exemplary embodiment of the invention hereunder, as well as from the appended drawings in which:

DETAILED DESCRIPTION OF PREFERRED EMBODIMENTS

Figure 6:
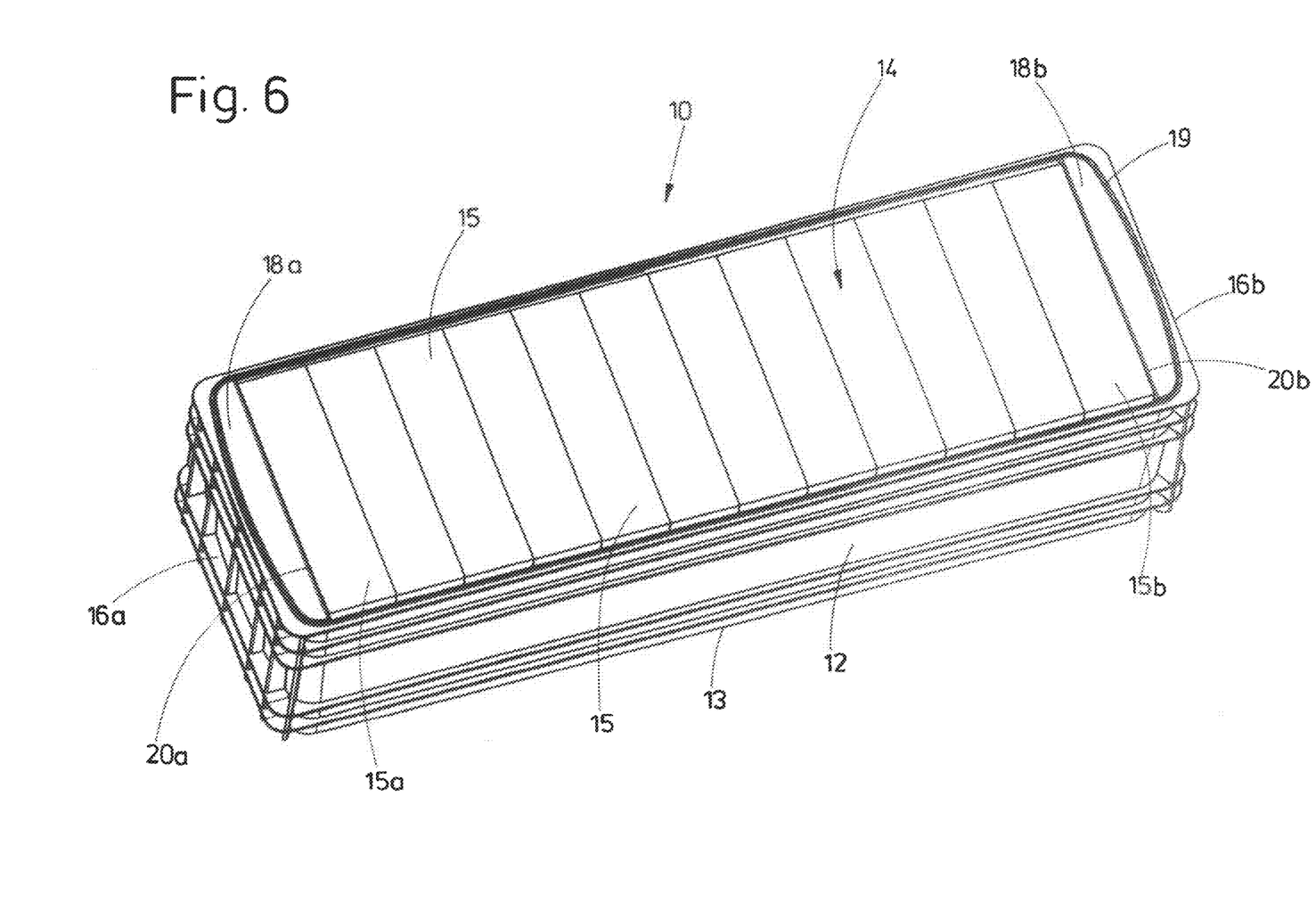
FIG. 6 shows the housing from FIG. 3 having a rechargeable battery pack disposed therein.
Figure 7:
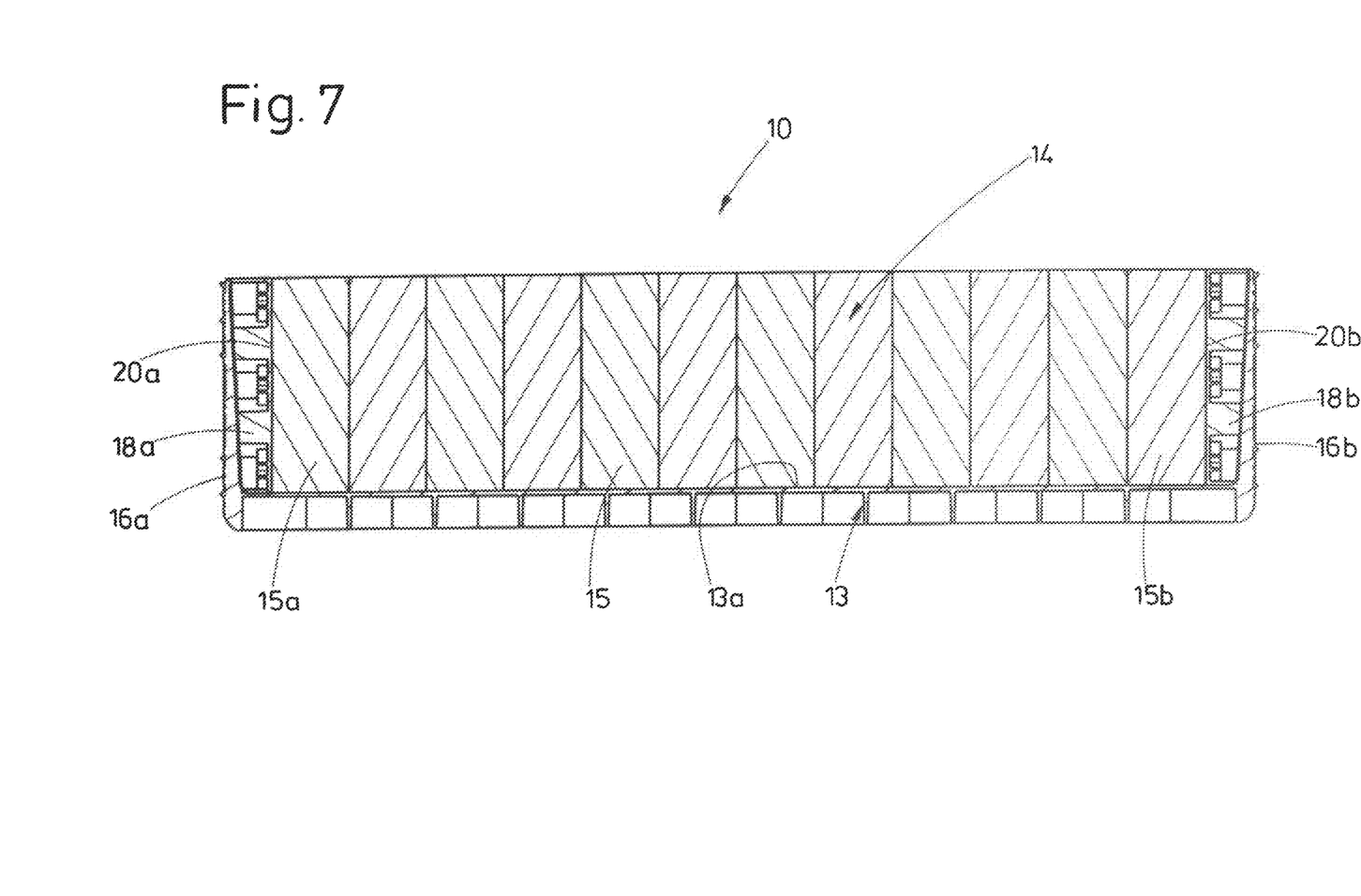
FIG. 7 shows a (longitudinal) section through the housing having a rechargeable battery pack according to FIG. 6.

An assembly according to the invention of a housing 10 according to the invention and a presently cuboid rechargeable battery pack 11 disposed therein is shown in FIGS. 6 and 7.

The housing 10 possesses a receptacle space 14 for the rechargeable battery pack 11, said receptacle space 14 being laterally delimited by an upright encircling housing wall 12 that surrounds said receptacle space 14, and delimited toward the bottom by a base wall 13 which extends in a plane perpendicular to the encircling housing wall 12 and which has a base area 13a which in this case serves as a support face for the rechargeable battery pack 11. The encircling housing wall 12, conjointly with the base wall 13, in the present case forms a trough-type component.

The rechargeable battery pack 11 is composed of individual rechargeable battery cells 15 which are disposed beside one another and in the present case are shaped so as to be prismatic or cuboid, respectively. The rechargeable battery cells 15 herein are disposed beside one another in one row, wherein respectively directly neighboring rechargeable battery cells 15 are mutually adjacent and contact one another. A first end side 20a of the rechargeable battery pack 11 at a first end of the latter is formed by a rechargeable battery cell 15a which is the first in the row, while a second end side 20b of the rechargeable battery pack 11 at an opposite end is formed by a rechargeable battery cell 15b which is the last in the row.

The rechargeable battery cells 15 are presently orientated in the row such that the large-area lateral faces of the rechargeable battery cells 15 of neighboring rechargeable battery cells 15 bear in each case on one another.

As is common place, the individual rechargeable battery cells 15 are electrically interconnected so as to form the rechargeable battery pack 11.

The rechargeable battery cells 15 when in operation each expand, presently specifically in each case in a manner perpendicular to the large-area lateral faces of said rechargeable battery cells 15. This so-called swelling of the individual rechargeable battery cells 15 in the absence of countermeasures would result in a corresponding spatial expansion of the entire rechargeable battery pack 11 in a manner perpendicular to the respective end sides 20a and 20b as well as lead to a reduction in the service life of the rechargeable battery pack 11.

In order for the swelling to be prevented or restricted, respectively, the rechargeable battery pack 11 is disposed so as to be pre-tensioned in the housing 10. In the present case, this is implemented such that in each case one spacer 18a or 18b, respectively, is disposed so as to be oversized or pre-tensioned, respectively, between the housing end walls 16a, 16b of the housing 10 that are formed by the encircling housing wall 12 and are disposed at a mutual spacing, or respectively, at opposite ends of the housing or the receptacle space, respectively, and the assigned or opposite, respectively, rechargeable battery pack end sides 20a, 20b.

The forces which during the swelling procedure emanate from the rechargeable battery pack 11, or from the end sides 20a, 20b, by way of the spacers 18a, 18b are correspondingly transmitted to the respective opposite housing end wall 16a or 16b, respectively.

The encircling housing wall 12, or the housing end walls 16a, 16b, respectively, in particular the shape and the mutual spacing thereof, as well as the shape of the spacers 18a, 18b, for this purpose as well as for transmitting in an ideally uniform manner the corresponding forces to the housing end walls 16a, 16b are suitably adapted to the rechargeable battery pack 11, or the end sides 20a, 20b, thereof, in particular to the shape of the latter and the mutual spacing of the latter.

Figure 3:
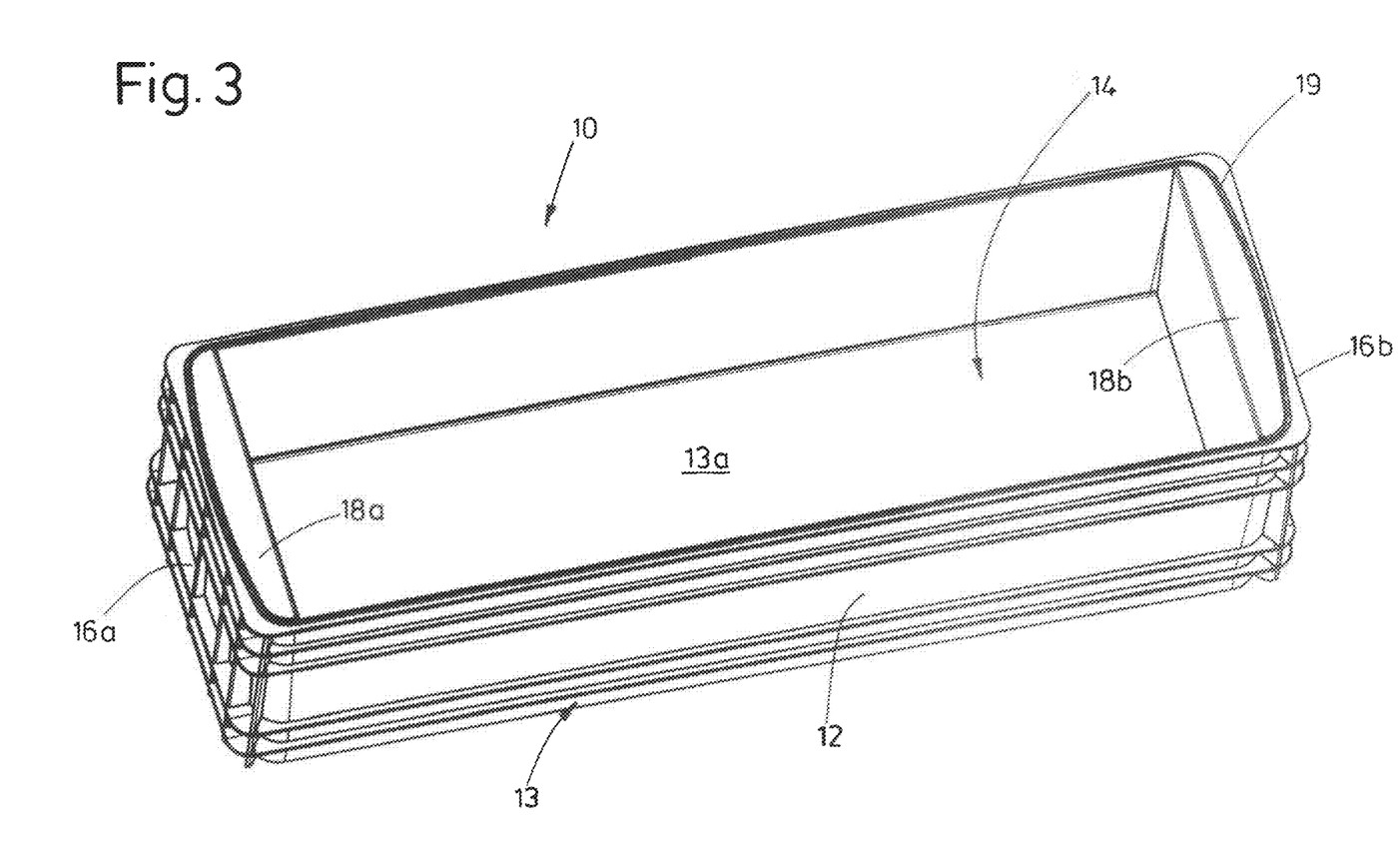
FIG. 3 shows the housing from FIG. 2 having in each case one spacer on two opposite housing end sides, likewise in an oblique view.
Figure 4:
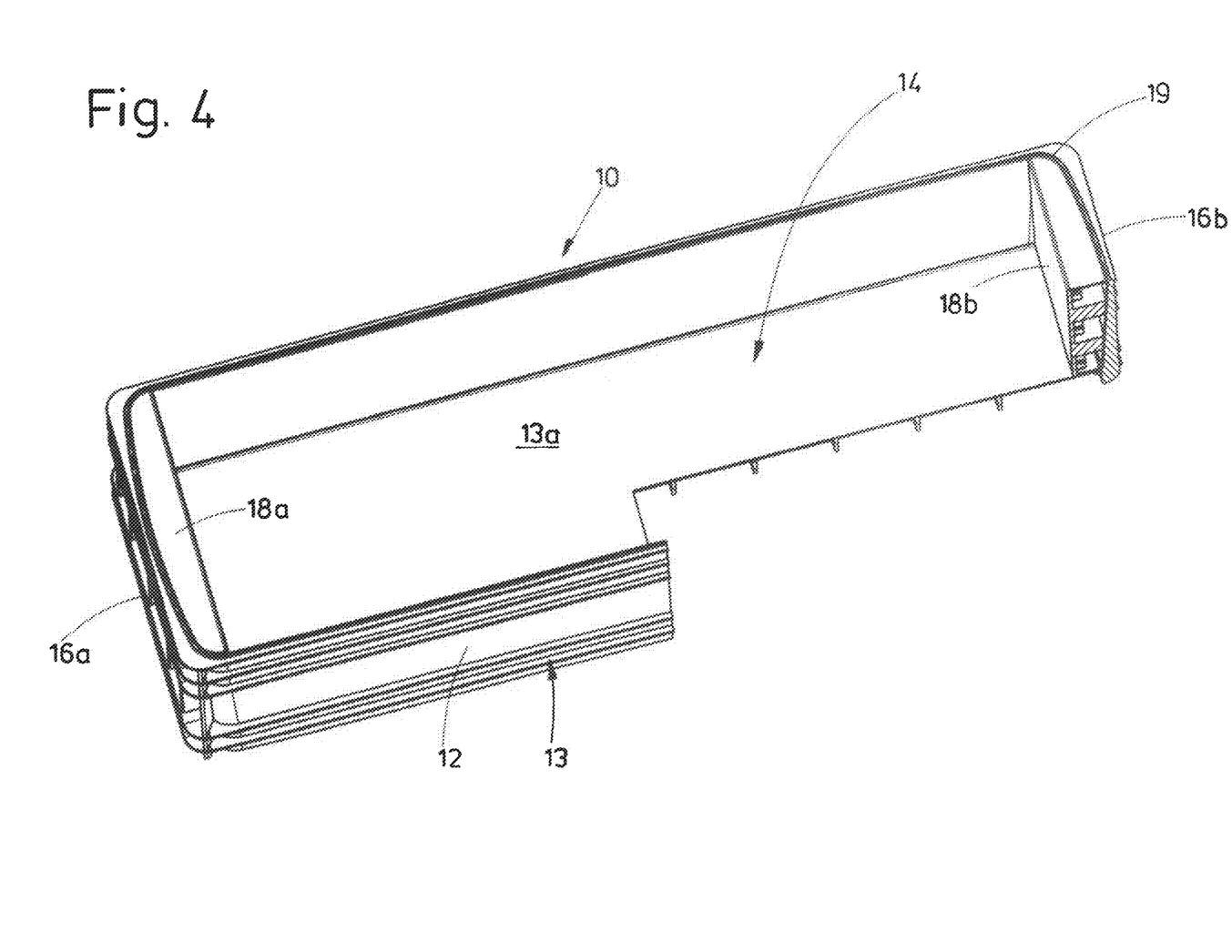
FIG. 4 shows the housing from FIG. 3 in a partially sectional view.
Figure 5:
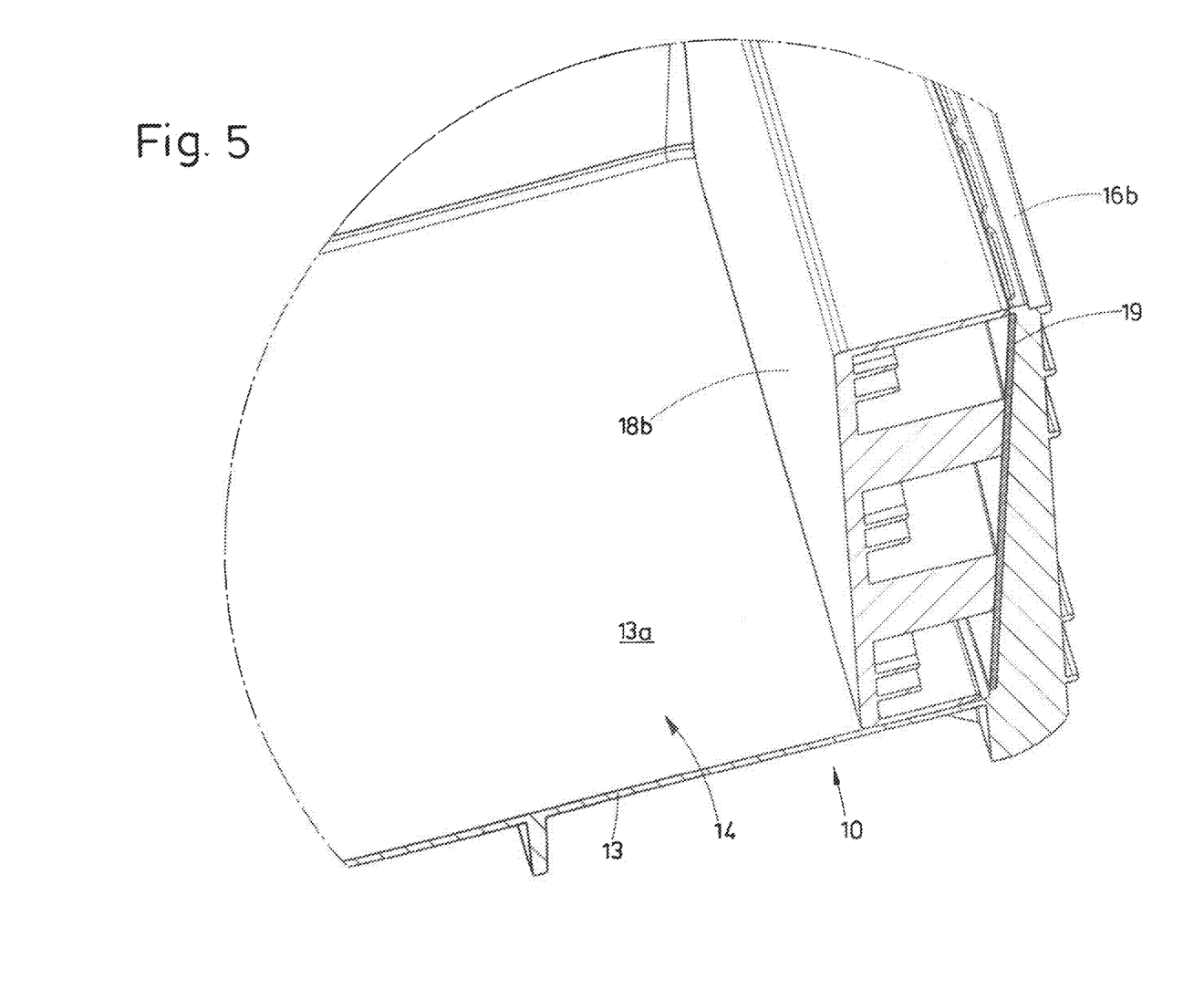
FIG. 5 shows an enlarged representation of the region I in FIG. 4.

The spacers 18a, 18b presently are configured so as to be wedge-shaped (conical). Said spacers 18a, 18b on the respective side pointing toward the respective housing end wall 16a, 16b presently are configured so as to be at least largely curved, specifically curved in the same manner as the internal sides of the housing end walls 16a, 16b which point toward the receptacle space 14 and on which the spacers 18a, 18b bear in each case.

In so far as the encircling housing wall 12 as well as the base wall 13 of the housing 10 are concerned, said housing wall 12 and said base wall 13 presently are produced from plastics material by means of an injection-molding method.

Figure 1:
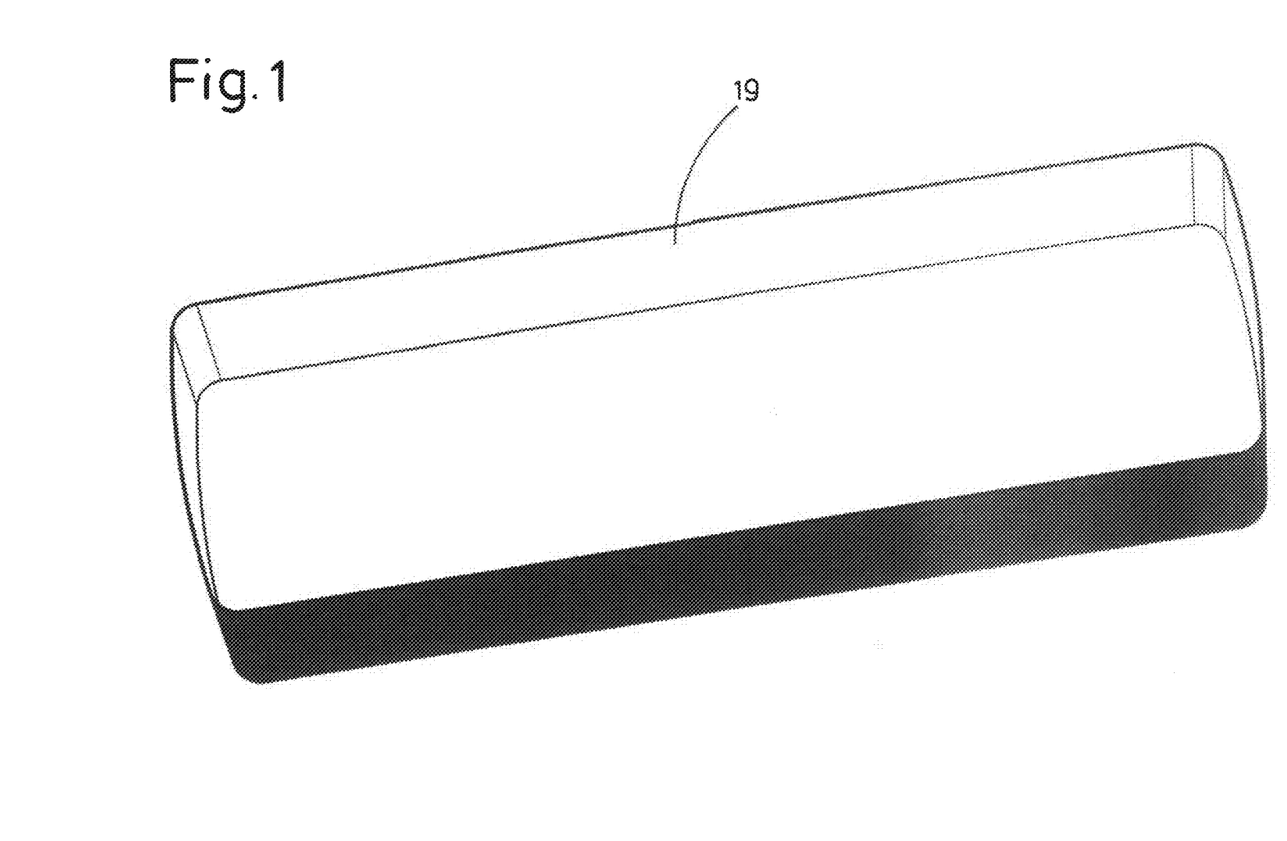
FIG. 1 shows a wound package for a housing according to the invention in an oblique view.
Figure 2:
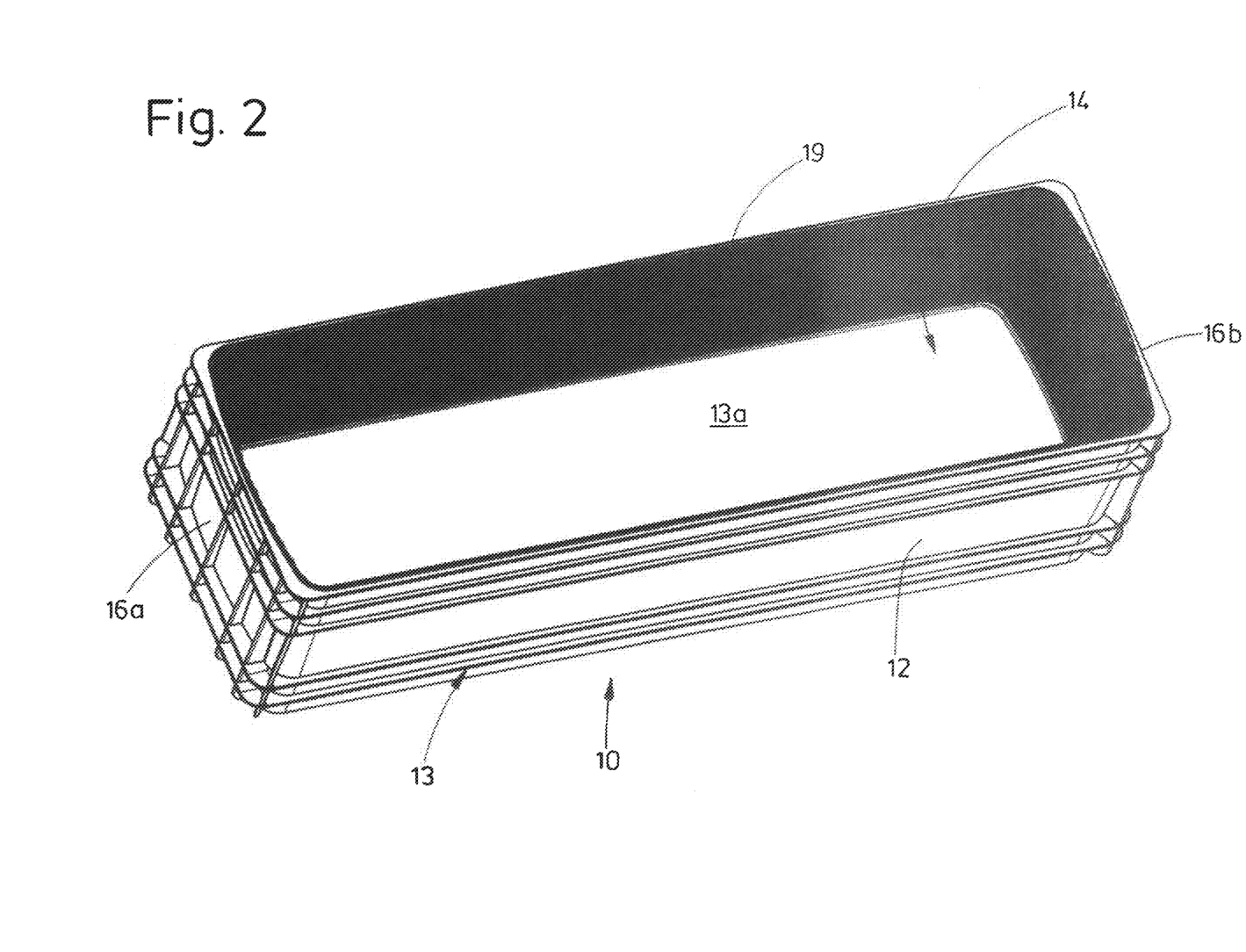
FIG. 2 shows a housing having an injection-molded encircling housing wall having a wound package integrated therein according to FIG. 1, likewise in an oblique view.

It is now particularly important that the encircling housing wall 12 is additionally reinforced by a reinforcement structure of a continuous fiber strand, specifically by a wound package 19 which is configured as a hollow member and which has individual windings (not shown) of the continuous fiber strand that are on top of one another, or in each case run in the direction perpendicular to the base face 13a, respectively.

The external shape of the wound package 19 herein is adapted to the shape of the encircling housing wall 12 to such an extent that the (closed) windings run in each case once completely in the encircling housing wall.

To this end, the wound package 19 in the context of the production of the housing wall 12 presently is placed as an insert part into an injection-molding device and subsequently over-molded or injection-molded with injection-molding plastics material.

Said wound package 19 is preferably over-molded (on all sides); this is however not mandatory.

The wound package 19 in the exemplary embodiment shown in the figures forms the internal side of the encircling housing wall 12 that points into the receptacle space 14, for example. However, said wound package 19 can also be integrated completely in the encircling housing wall such that said wound package 19 is surrounded on all sides by the injection-molding plastics material.

Such a wound package 19 can inter alia be produced by a robot which winds a continuous fiber strand of a suitable, for example temporarily flexural, curable material about a winding core and subsequently retrieves said endless fiber strand from the winding core.

The continuous fiber strand is preferably composed of continuous glass fibers which are embedded in a matrix of thermosetting or thermoplastic plastics material or polymer material. The strand can comprise glass fibers and/or aramid and/or carbon fibers, for example.

In a specific example of a suitable continuous fiber strand, the latter can comprise glass fibers, for example, which are embedded in a PP matrix, the content of fibers in terms of volume being between 30% and 38%, preferably 34%.

In terms of production technology, after the production of the encircling housing wall 12 having the wound package 19 integrated therein, as well as after the production of the housing wall of the rechargeable battery pack 11 that has the base face 13, optionally in the same injection-molding method, said rechargeable battery pack 11, while applying forces which compress the rechargeable battery pack 11, conjointly with the spacers 18a, 18b is incorporated in the receptacle space 14 of the housing 10.

As has been described in more detail at the outset, the housing 10 can moreover have a cooling component which is not illustrated in FIGS. 1 to 7 and which contributes toward the cooling of the rechargeable battery cells 15 of the rechargeable battery pack 11, cooling liquid being able to be directed through said cooling component.

Figure 8:
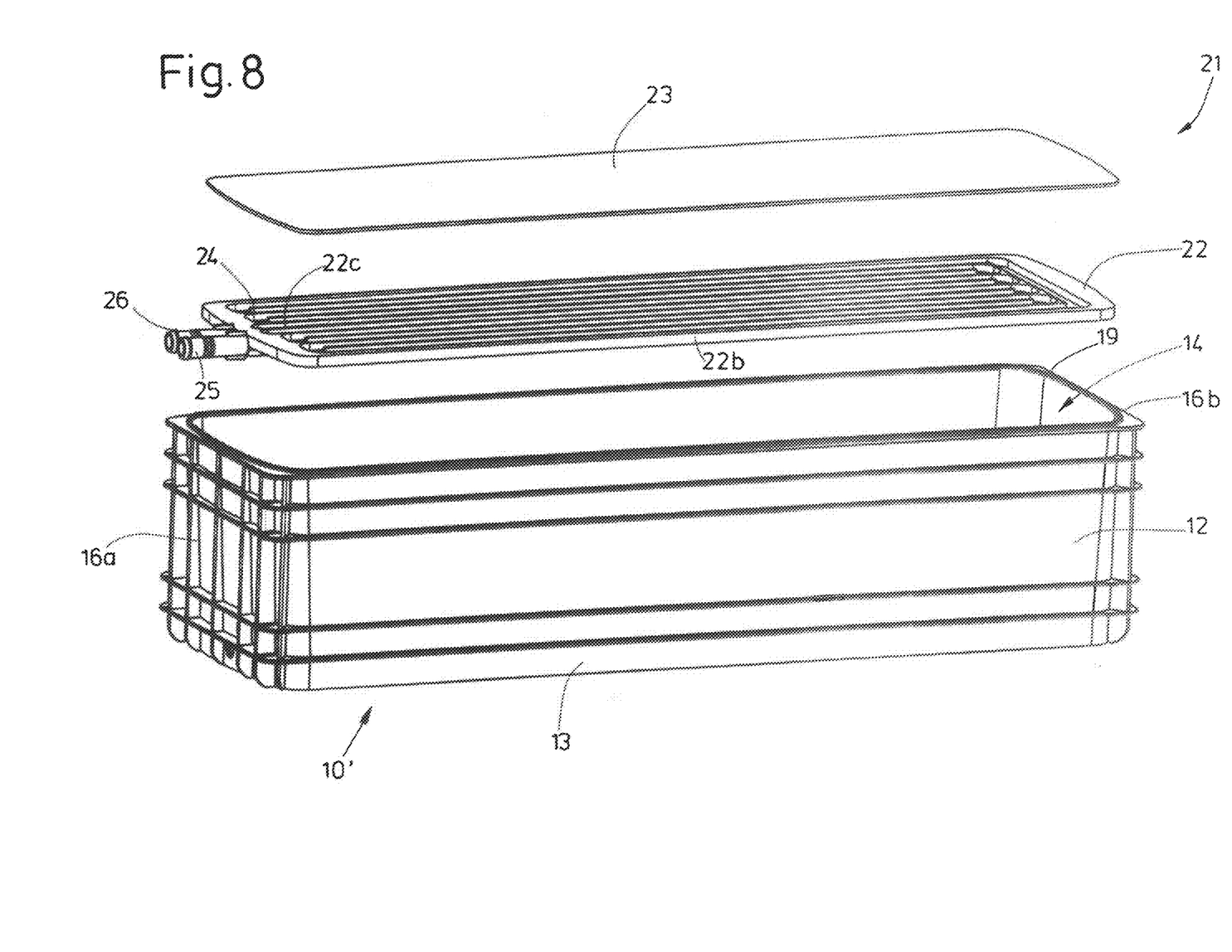
FIG. 8 shows a housing similar to that in FIG. 2, however conjointly with a cooling component which is integrated in the housing, as an exploded illustration.
Figure 9:
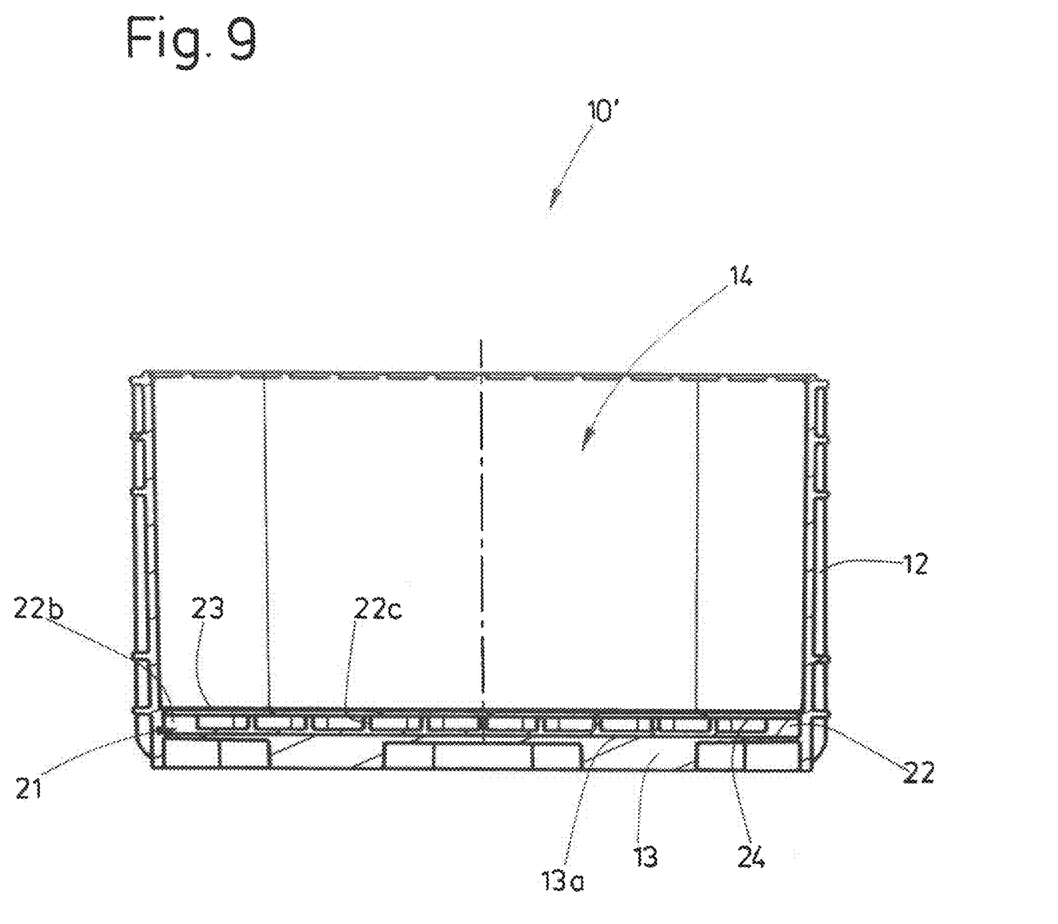
FIG. 9 shows the housing from FIG. 8 in the cross section, having a cooling component which is integrated in the base region of the housing.

A housing 10' having such a cooling component 21 is illustrated in FIGS. 8 and 9, wherein the housing 10' to a large extent is identical to the housing 10. The points of differentiation in comparison to housing 10 will be discussed hereunder.

The cooling component 21 possesses an injection-molded trough-type main body 22 of plastics material, having a base wall 22a and an encircling (upright) lateral wall 22b which presently is connected in an integral manner to said base wall 22a.

The cooling component 21 furthermore possesses an in particular plate-shaped thermally conducting member 23, presently of aluminum, which is connected to the main body 22. The plate-type thermally conducting member could however also be composed of another metal or of a particularly thermally conductive plastics material.

The main body 22 and the thermally conducting member 23 conjointly form a cooling liquid chamber (or enclose the latter, respectively) through which cooling liquid is directed.

The cooling liquid chamber presently is formed by individual cooling liquid ducts 24 which are laterally delimited by upright duct walls 22c which are formed by the main body, said delimitation toward the bottom taking place by the base wall 22a of the main body 22 and toward the top by the thermally conducting member 23.

Cooling liquid can be supplied to the cooling component 21 by way of an inlet 25 and an outlet 26, or cooling liquid can be guided out of said cooling component 21 by said inlet 25 and said outlet 26, respectively.

The cooling component 21 is integrated in the base region of the housing 10'. For this purpose, the cooling component 21 presently is disposed on the internal side so as to be above the base wall 13 of the housing 10', in particular so as to bear on the base wall 13, this however not being mandatory.

Specifically, the base wall 22a of the main body 22 sits on the base area 13a of the base wall 13.

The thermally conducting member 23, specifically the external side thereof, forms the support face for a/the rechargeable battery pack 11, said support face delimiting the receptacle space 14, while the internal side of said thermally conducting member 23 is adjacent to the cooling liquid chamber of the cooling component 21.

Accordingly, exhaust heat from the rechargeable battery pack 11 by way of the thermally conducting member 23 is transmitted directly to the cooling liquid situated in the cooling liquid chamber of the cooling component 21.

It is understood that various other configurations of a housing according to the invention and of a wound package integrated therein as a reinforcement structure are possible without departing from the basic concept according to the invention. It is thus at least theoretically also conceivable for one wound package or a plurality of wound packages to be incorporated only in those housing wall portions of the encircling housing wall that are actually exposed to the stresses of swelling.

LIST OF REFERENCE SIGNS

10 Housing
10' Housing
11 Rechargeable battery pack
12 Encircling housing wall
13 Base wall
13a Base area
14 Receptacle space
15 Rechargeable battery cell
15a First rechargeable battery cell
15b Last rechargeable battery cell
16a Housing end wall
16b Housing end wall
18a Spacer
18b Spacer
19 Wound package
20a Rechargeable battery pack end side
20b Rechargeable battery pack end side
21 Cooling component
22 Main body
22a Main body base wall
22b Main body lateral wall
22c Upright duct walls of main body
23 Thermally conducting member
24 Cooling liquid ducts
25 Inlet
26 Outlet

The invention claimed is:

1. A housing for receiving a rechargeable battery pack (11) having a plurality of rechargeable battery cells, having an injection-molded encircling housing wall (12) of a plastics material and having a shape which laterally surrounds a receptacle space for the rechargeable battery pack (11), and in which at least one wound package (19) wound from a strand of continuous fibers is integrated in the encircling housing wall (12) as a reinforcement structure, wherein the wound package (19) integrated in the encircling housing wall (12) is a hollow member that at least in portions is adapted to the shape of the encircling housing wall (12), and wherein the wound package (19) has windings that run in the encircling housing wall (12).

2. The housing as claimed in claim 1, wherein the receptacle space has a bottom towards which is delimited by a base area (13) which serves as a support face for the rechargeable battery pack (11), wherein the base area (13) runs perpendicular, or substantially perpendicular, to the encircling housing wall (12), and wherein the windings of the wound package (19) in the housing wall (12) run parallel, or substantially parallel, to the base area (13).

3. The housing as claimed in claim 1, wherein the wound package (19), while forming the encircling housing wall (12), is over-molded or insert-molded on all sides with the plastics material of the encircling housing wall (12).

4. The housing as claimed in claim 1, wherein the housing has an injection-molded base wall which is connected in an integral manner to the encircling housing wall (12).

5. The housing as claimed in claim 2, further comprising a cooling component for discharging heat from a rechargeable battery pack (11) situated in the receptacle space, the cooling component being integrated in the base area (13) of the housing, and coolant that is directed through the cooling component.

6. The housing as claimed in claim 5, wherein the cooling component has a main body of plastics material and a plate-shaped thermally conducting member which is connected in a liquid-tight manner to the main body and which is of a material having a thermal conductivity greater than a thermal conductivity of the plastics material of the main body, wherein, for transmitting heat from the thermally conducting member to cooling liquid situated in a cooling liquid chamber of the cooling component, the thermally conducting member has an internal side which is adjacent to the cooling liquid chamber, and for transmitting heat from the rechargeable battery pack (11) to the thermally conductive member, the thermally conducting member has an external side which points toward the receptacle space for the rechargeable battery pack (11) or is adjacent to the rechargeable battery pack (11).

7. The housing as claimed in claim 5, wherein the cooling component has a main body and at least one wall, and wherein the at least one wall of the main body of the cooling component is connected in an integral manner to the encircling housing wall (12) and/or the base wall of the housing.

8. The housing as claimed in claim 5, wherein the cooling component has a main body that has walls that delimit the cooling liquid chamber, of which at least one of the walls in a connection region is connected in a liquid-tight manner to the thermally conducting member in such a manner that no cooling liquid can exit the cooling liquid chamber toward the outside through the connection region.

9. The housing as claimed in claim 5, wherein the cooling component has a main body that has an inlet and an outlet by way of which cooling liquid can be supplied to the cooling component, or be discharged from the cooling component, respectively, and wherein the inlet and the outlet are fluidically connected to the cooling liquid chamber.

10. The housing as claimed in claim 5, wherein the cooling component has a main body that is an injection-molded part made of a fiber-reinforced thermoplastic material.

11. The housing as claimed in claim 6, wherein
the main body has a base wall having an upright fully encircling lateral wall which is connected in an integral manner to the base wall and surrounds the cooling liquid chamber toward an outside region of the cooling liquid chamber,
an upper side of the lateral wall being connected in a liquid-tight manner to the plate-shaped thermally conducting member such that an internal side of the thermally conducting member points toward the base wall, and
an external side of the thermally conducting member while forming the base area (13) of the housing and serving as a support face for the rechargeable battery pack (11), faces the receptacle space for the rechargeable battery pack (11).

12. The housing as claimed in claim 6, wherein the main body, in a space of the main body that is delimited by the lateral wall, has at least one upright main body wall which is connected in an integral manner to the base wall and to the lateral wall and which extends between the base wall and the thermally conducting member, an upper side of the main body wall likewise being connected in a liquid-tight manner to the thermally conducting member.

13. The housing as claimed in claim 6, wherein the main body and the thermally conducting member are connected to one another in a liquid-tight manner by way of a form-fitting and/or force-fitting and/or materially integral connection.

14. The housing as claimed in claim 5, wherein the strand of continuous fibers comprises aramid and/or carbon and/or glass fibers which are embedded in a matrix of a thermosetting or thermoplastic plastics material or polymer material.

15. An assembly of a housing and a rechargeable battery pack (11) contained therein, said rechargeable battery pack (11) having a group of rechargeable battery cells which are adjacent to one another and disposed beside one another in one row, and said housing having an injection-molded encircling housing wall (12) of a plastics material and having a shape which laterally surrounds a receptacle space for the rechargeable battery pack (11), and in which at least one wound package (19) wound from a strand of continuous fibers is integrated in the encircling housing wall (12) as a reinforcement structure, wherein the wound package (19) integrated in the encircling housing wall (12) is a hollow member that at least in portions is adapted to the shape of the encircling housing wall (12), and wherein the wound package (19) has windings that run in the encircling housing wall (12).

16. The assembly as claimed in claim 15, wherein the assembly comprises at least two separate spacers (18a, 18b) which are made of plastics material, wherein the first spacer (18a) is disposed between a first housing wall portion of the encircling housing wall (12) and a first side of the rechargeable battery pack (11) that is disposed at a first end of the rechargeable battery pack (11), and the second spacer (18b) is disposed between a second housing wall portion of the encircling housing wall (12), opposite the first housing wall portion, and a second side of the rechargeable battery pack that is disposed at another, second, end of the rechargeable battery pack (11).

17. The assembly as claimed in claim 16, wherein each of the spacers (18a, 18b) is disposed so as to be pre-tensioned between the respective housing wall portion assigned thereto and the side of the rechargeable battery pack assigned thereto such that forces acting in the direction of the respective other rechargeable battery pack end by way of each of the spacers (18a, 18b) are applied to the respective side of the rechargeable battery pack (11) so as to prevent or reduce any swelling of the rechargeable battery pack (11).

18. The assembly as claimed in claim 16, wherein each of the spacers (18a, 18b) bears on the assigned housing wall portion and/or on the assigned side of the rechargeable battery pack.

19. The assembly as claimed in claim 18, wherein each of the spacers (18a, 18b) is adapted to the shape of the assigned housing wall portion and/or the assigned side of the rechargeable battery pack.

20. The assembly as claimed in claim 16, wherein the two ends of the rechargeable battery pack (11) that are in each case assigned to the spacers (18a, 18b) are formed by the first or the last rechargeable battery cell, respectively, in the row of rechargeable battery cells.

21. A method for producing a housing for receiving a rechargeable battery pack (11) having a plurality of rechargeable battery cells, the method comprising:
a) winding a wound package (19) from a continuous fiber strand for producing an encircling housing wall (12) having a shape that laterally surrounds a receptacle space for a rechargeable battery pack (11), wherein the wound package (19) is formed as a hollow member which at least in portions is adapted to the shape of the encircling housing wall (12); and
b) producing the encircling housing wall (12) that laterally surrounds the rechargeable battery pack (11) by over-molding or insert-molding, on all sides, the wound package (19) with plastics material in an injection-molding device, so that windings of the wound package (19) run in the encircling housing wall (19).

22. The method as claimed in claim 21, further comprising:
   a) producing, by injection-molding, from a fiber-reinforced plastics material, a main body of a cooling component for discharging heat from a rechargeable battery pack situated in the housing, the main body having walls for forming a cooling liquid chamber and at least one connection face for connecting to a plate-shaped thermally conducting member;
   b) providing the plate-shaped thermally conducting member having the at least one connection face which is provided for connecting to the connection face of the main body;
   c) joining the thermally conducting member and the main body so as to form the cooling component in that the connection faces are connected to one another in a form-fitting and/or force-fitting and/or materially integral manner so as to bear on one another in a liquid-tight manner; and
   d) producing the encircling housing wall (12) and an integral connection between the encircling housing wall (12) and the cooling component in an injection-molding device by over-molding or insert-molding the cooling component and the wound package (19).

23. A method for producing an assembly of a housing for receiving a rechargeable battery pack (11), the rechargeable battery pack (11) having a plurality of rechargeable battery cells that are mutually adjacent to one another and are disposed beside one another in one row, the method comprising:
   a) producing, by winding from a continuous fiber strand, a wound package (19) for producing an encircling housing wall (12) has a shape that laterally surrounds a receptacle space for the rechargeable battery pack (11), wherein the wound package (19) is formed as a hollow member which at least in portions is adapted to the shape of the encircling housing wall (12);
   b) producing the encircling housing wall (12) which laterally surrounds the receptacle space for a rechargeable battery pack (11), by inserting the hollow wound package (19) into an injection-molding device, and subsequently over-molding or insert-molding, on all sides, the hollow wound package (19) with plastics material, so that windings of the wound package (19) run in the encircling housing wall (12); and
   c) incorporating the rechargeable battery pack (11) into the receptacle space.

24. The method as claimed in claim 23, wherein the rechargeable battery pack (11) conjointly with two separate spacers (18a, 18b) is incorporated into the receptacle space such that subsequently a first spacer (18a) of the two spacers (18a, 18b) is disposed between a first housing wall portion of the encircling housing wall (12) and a first side of the rechargeable battery pack (11) that is disposed at a first end of the rechargeable battery pack (11), and a second spacer (18b) of the two spacers (18a, 18b) is disposed between a second housing wall portion of the encircling housing wall (12), opposite the first housing wall portion, and a second side of the rechargeable battery pack (11) that is disposed at another, second, end of the rechargeable battery pack (11).

25. The method as claimed in claim 24, wherein each of the two spacers (18a, 18b) is disposed so as to be pre-tensioned between the housing wall portion assigned thereto and the side of the rechargeable battery pack (11) assigned thereto such that forces acting in the direction of the respective other rechargeable battery pack end by way of each of the spacers (18a, 18b) are applied to the respective side of the rechargeable battery pack (11) so as to prevent or reduce any swelling of the rechargeable battery pack (11).

26. The method as claimed in claim 24, wherein the rechargeable battery pack (11) conjointly with the two spacers (18a, 18b), are incorporated into the receptacle space, the two spacers (18a, 18b) so as to be pre-tensioned herein being pushed onto the sides of the rechargeable battery pack (11).

27. The housing as claimed in claim 1, wherein the rechargeable battery cells are selected from the group consisting of prismatic rechargeable battery cells and rechargeable pouch battery cells.

* * * * *